(12) United States Patent
Wu

(10) Patent No.: US 7,699,252 B2
(45) Date of Patent: Apr. 20, 2010

(54) OUTLET DEVICE OF A GRINDER

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 130 days.

(21) Appl. No.: 11/907,140

(22) Filed: Oct. 10, 2007

(65) Prior Publication Data

US 2009/0095832 A1 Apr. 16, 2009

(51) Int. Cl.
*A47J 42/04* (2006.01)
(52) U.S. Cl. .................................................. 241/169.1
(58) Field of Classification Search ............... 241/169.1
See application file for complete search history.

(56) References Cited

U.S. PATENT DOCUMENTS 4,231,527 A * 11/1980 Bounds .................... 241/169.1
5,626,299 A * 5/1997 Haynes ..................... 241/169.1
7,328,865 B1 * 2/2008 Mills ........................ 241/169.1

* cited by examiner

*Primary Examiner*—Mark Rosenbaum
(74) *Attorney, Agent, or Firm*—Rosenberg, Klein & Lee

(57) ABSTRACT

A grinder includes a body, which has a holding room in a bottom portion thereof; the grinder includes a rotating operational component on an upper end of the body, and a grinding mechanism in an upper portion of the holding room; the rotating operational component and the grinding mechanism are coupled by means of a transmission rod; the bottom portion of the grinder body has several outlet holes on a peripheral side for the holding room to communicate with an outside; a stopping board is secured over a lower end of the holding room of the grinder body so as to seal up the lower end of the holding room; the user is allowed to tilt the grinder to make ground seasoning fall out through the outlet holes; seasoning won't fall out of the holding room to dirty the table even if the grinder is subjected to external force accidentally.

3 Claims, 5 Drawing Sheets

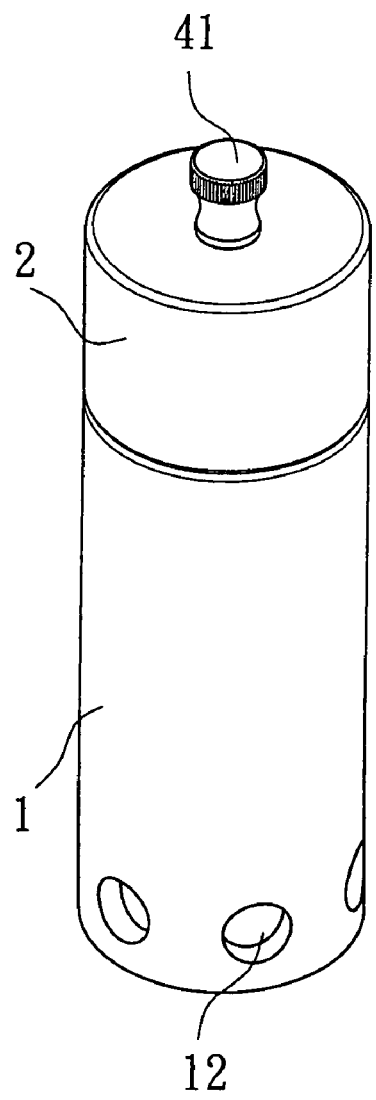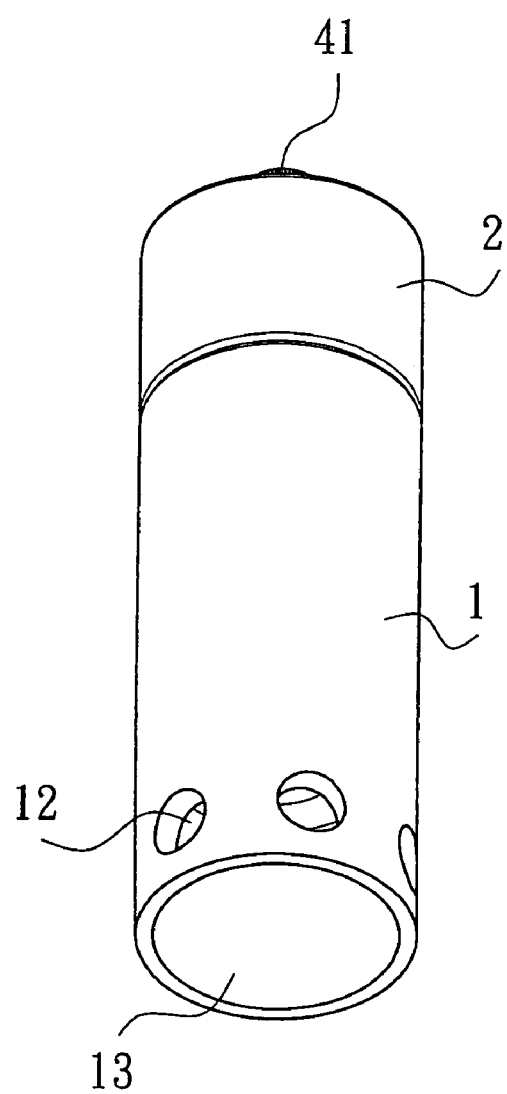

OUTLET DEVICE OF A GRINDER

BACKGROUND OF THE INVENTION

1. Field of the Invention

The present invention relates to an outlet device of a grinder, more particularly one, which includes a holding room in a bottom portion of a body of the grinder, several outlet holes on a peripheral side of the bottom portion of the grinder body, and a stopping board secured over a lower end of the holding room to seal up the lower end of the holding room; thus, seasoning won't fall out of the holding room to dirty the table even if the grinder is subjected to external force accidentally.

2. Brief Description of the Prior Art

In order to preserve the original taste of various kinds of seasonings, seasonings are usually stored in a larger size, which will be ground and directly dispensed by means of seasoning grinders when people want to add them to foods/food materials.

Referring to FIG. 6, a common grinder 5 includes a hollow body 51, a rotating operational member 52 on an upper end of the hollow body 51, a transmission rod 53 received in the hollow body 51 and securely joined to the rotating operational member 52, an inner grinding toothed member 54 securely joined to a lower end of the transmission rod 53, and an outer grinding toothed member 55 secured around the inner grinding toothed member 54 in the hollow body 51. The grinder body 51 has an opening 511 on a lower end thereof.

Therefore, a person is allowed to rotate the rotating operational member 52 so as to make the transmission rod 53 and the inner grinding toothed member 54 rotate relative to the outer grinding toothed member 55; thus, seasoning corns falling into the space between the inner and the outer grinding toothed members 54 and 55 are ground into powder, which will fall down onto foods/food materials through the lower opening 511 of the body 51 next.

The above grinder structure has a drawback: seasoning powder is prone to fall down from the space between the inner and the outer grinding toothed members 54 and 55 to dirty the table when the user fails to put the grinder onto the table in a gentle manner or when the grinder is subjected to external force while resting on the table. Consequently, the table needs to be cleaned frequently. From the above description, it can be seen that such a grinder is inconvenient to use.

SUMMARY OF THE INVENTION

It is a main object of the present invention to provide an improvement on an outlet device of the grinder to overcome the above problems.

A grinder according to an embodiment of the present invention includes a body, a rotating operational component on an upper end of the body, and a grinding mechanism. The grinder body has a holding room in a bottom portion, and the grinding mechanism is positioned in an upper portion of the holding room. The rotating operational component and the grinding mechanism are coupled by means of a transmission rod. The bottom portion of the body has several outlet holes on a peripheral side for the holding room to communicate with an outside, and a stopping board is secured over a lower end of the holding room. Therefore, the user is allowed to tilt the grinder to make ground seasoning fall out through the outlet holes. And, seasoning won't fall out of the holding room to dirty the table even if the grinder is subjected to external force accidentally.

The stopping board can be flat or formed with several sloping sides to help seasoning powder to pass out of the holding room through the outlet holes of the grinder body.

BRIEF DESCRIPTION OF THE DRAWINGS

The present invention will be better understood by referring to the accompanying drawings, wherein:

FIG. 1 is a perspective view of the present invention (1),

FIG. 2 is a perspective view of the present invention (2),

DETAILED DESCRIPTION OF THE PREFERRED EMBODIMENTS

Figure 3:
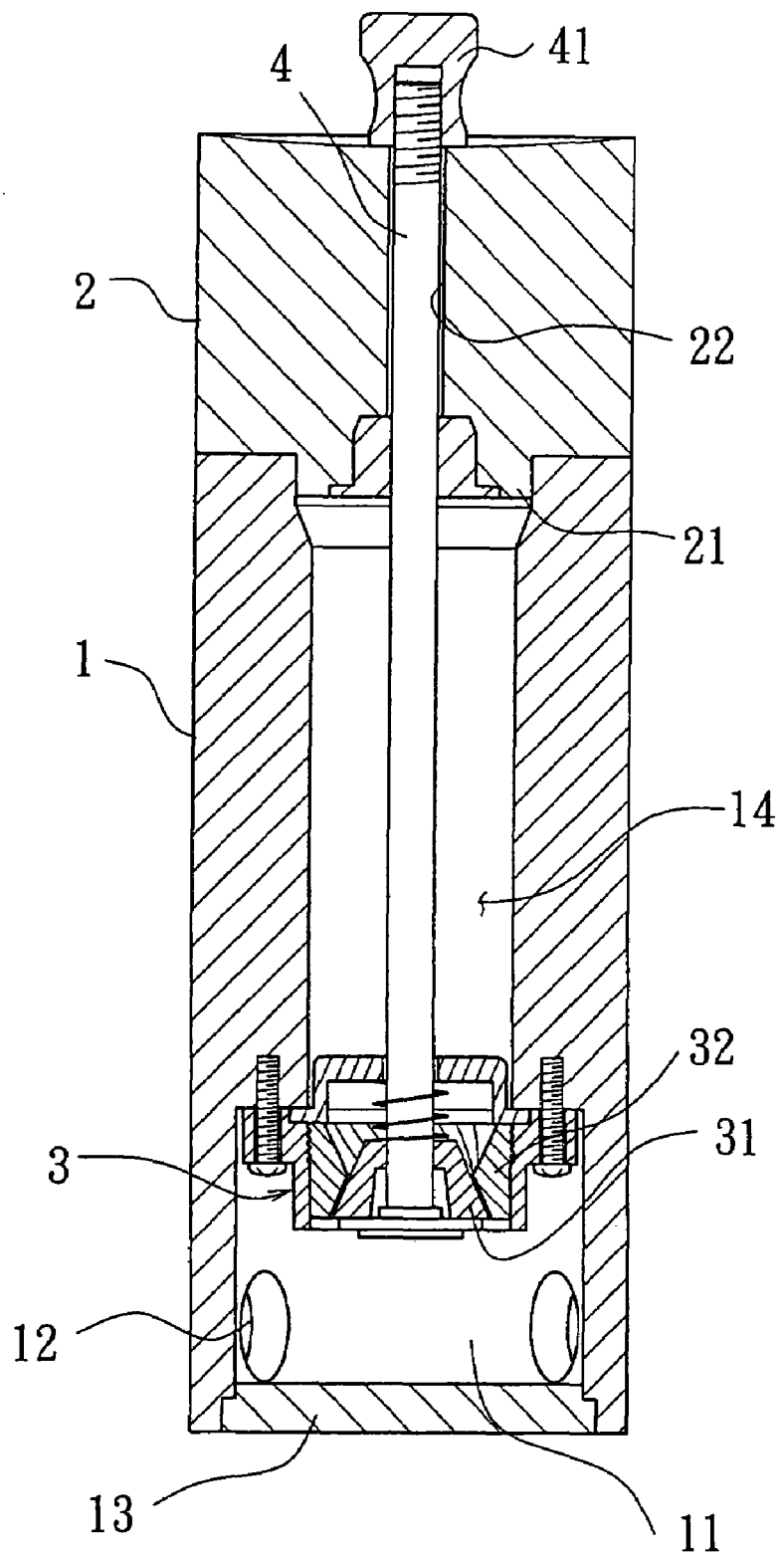
FIG. 3 is a sectional view of the present invention.

Referring to FIGS. 1 and 2, a first preferred embodiment of a grinder of the present invention includes:

a grinder body 1, the grinder body 1 has a holding room 11 in a bottom portion thereof, and a holding hole 14, which is above and in open communication with the holding room 11, and extends through an upper end of the grinder body 1; the grinder body 1 has at least one outlet holes 12 on a peripheral side of the bottom portion thereof so that the holding room 11 is in open communication with an outside;

a stopping board 13, which is secured over a lower end of the holding room 11 of the grinder body 1 so as to seal up the lower end of the holding room 11; the stopping board 13 of the first preferred embodiment is flat;

a rotating operational component 2 positioned on the upper end of the grinder body 1; the rotating operational component 2 has a hole 22 extending through a center thereof; the rotating operational component 2 has a locating protrusion 21 on a bottom thereof, which is received in the holding hole 14 of the grinder body 1;

a transmission rod 4, the transmission rod 4 is received in the grinder body 1, and sticks out from the central hole 22 of the rotating operational component 2 at an upper end thereof; the transmission rod 4 and the rotating operational component 2 are joined together by means of a fixing piece 41, which is threadedly engaged with the upper end of the transmission rod 4; and a grinding mechanism 3 held in an upper portion of the holding room 11 of the grinder body 1; the grinding mechanism 3 includes an inner grinding toothed member 31, and an outer grinding toothed member 32; the inner grinding toothed member 31 is securely joined to a lower end of the transmission rod 4.

To use the grinder, referring to FIG. 3, seasoning corns are put in the holding hole 14 of the grinder body 1 first, and next the rotating operational component 2 is positioned on the upper end of the grinder body 1 with the locating protrusion 21 being received in the holding hole 14, and with the transmission rod 4 sticking out from the central hole 22 of the rotating operational component 2. And, the fixing piece 41 is positioned around and threadedly engaged with the upper end of the transmission rod 4. Then, the user rotates the rotating operational component 2 so as to make the transmission rod 4 and the inner grinding toothed member 31 of the grinding mechanism 3 rotate relative to the outer grinding toothed member 32; thus, seasoning corns falling into the space between the inner and the outer grinding toothed members 31 and 32 are ground into powder, and fall into the holding room 11 in the bottom portion of the grinder body 1. While the user is rotating the rotating operational component 2, he can tilt the grinder in order for the seasoning powder to fall out of the holding room 11 and onto foods/food materials through the outlet holes 12 of the grinder body 1.

The stopping board 13 can prevent seasoning powder from falling out through the lower end of the holding room 11 of the grinder body 1 when the grinder stands upright on a table. Therefore, seasoning powder won't fall out to dirty the table even if a person hits against the table or the grinder accidentally/the user fails to put the grinder on the table in a gentle way.

Figure 4:
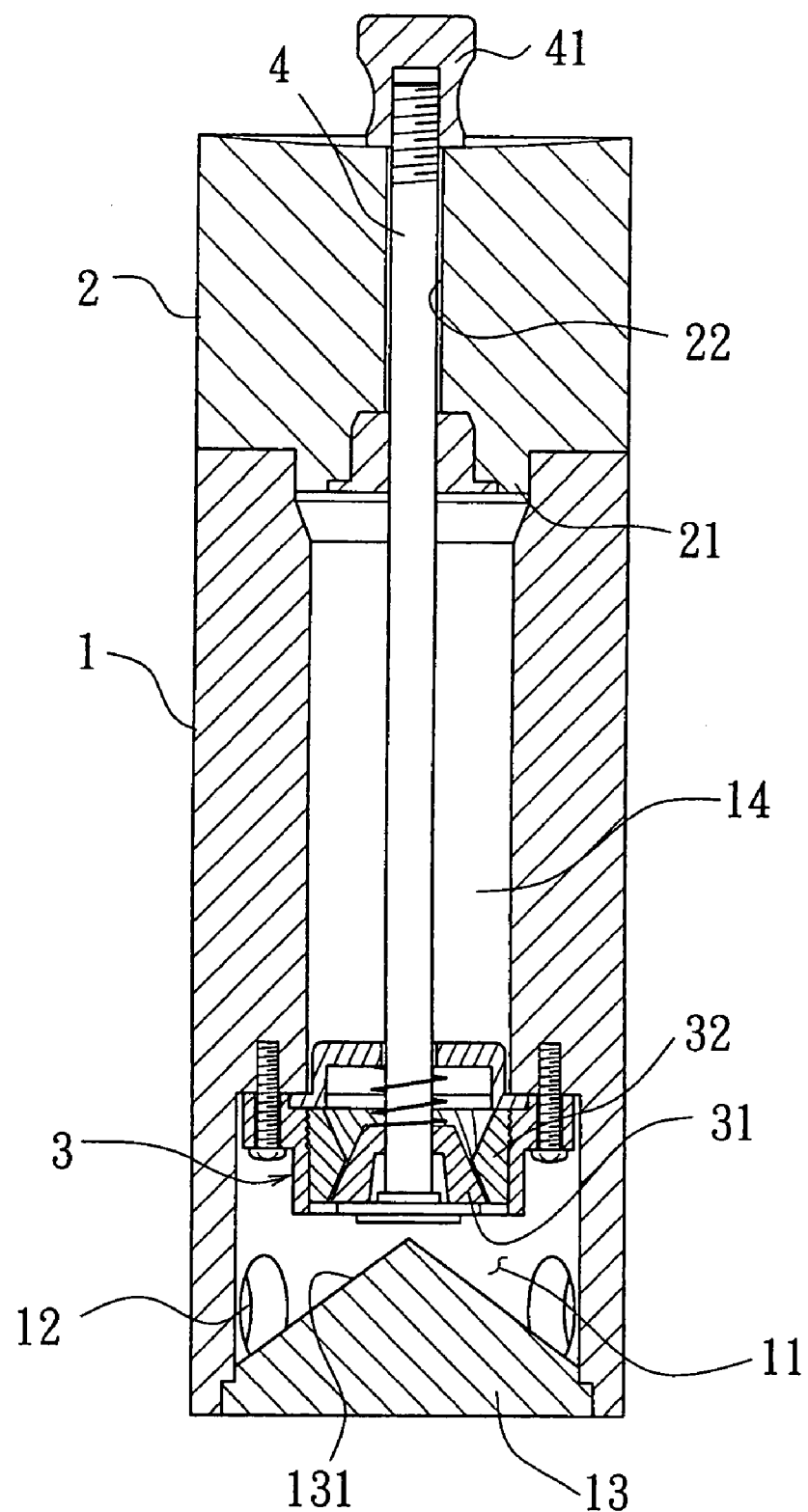
FIG. 4 is a sectional view of a second preferred embodiment of the present invention.
Figure 5:
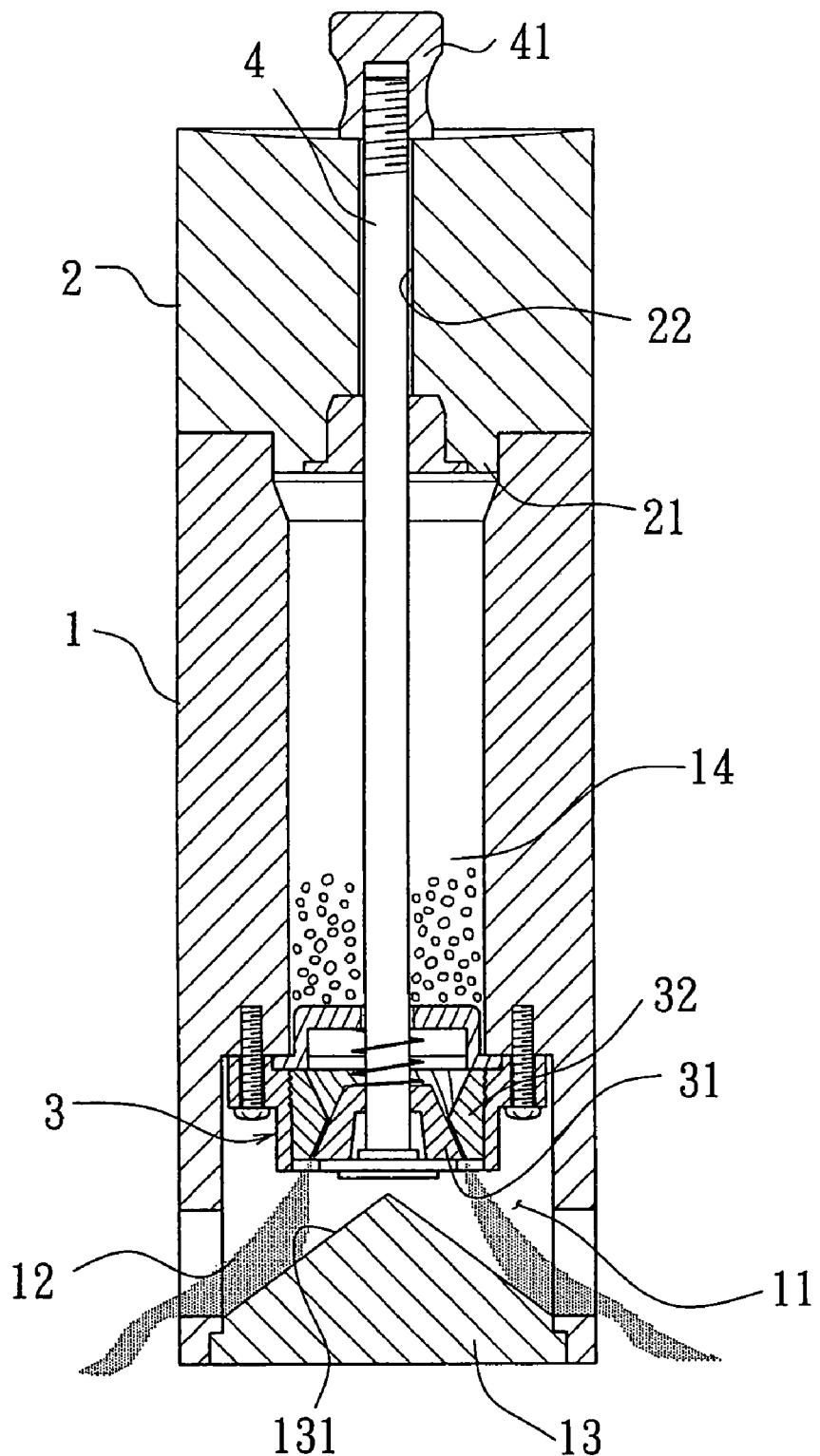
FIG. 5 is a view of the second preferred embodiment in use.
Figure 6:
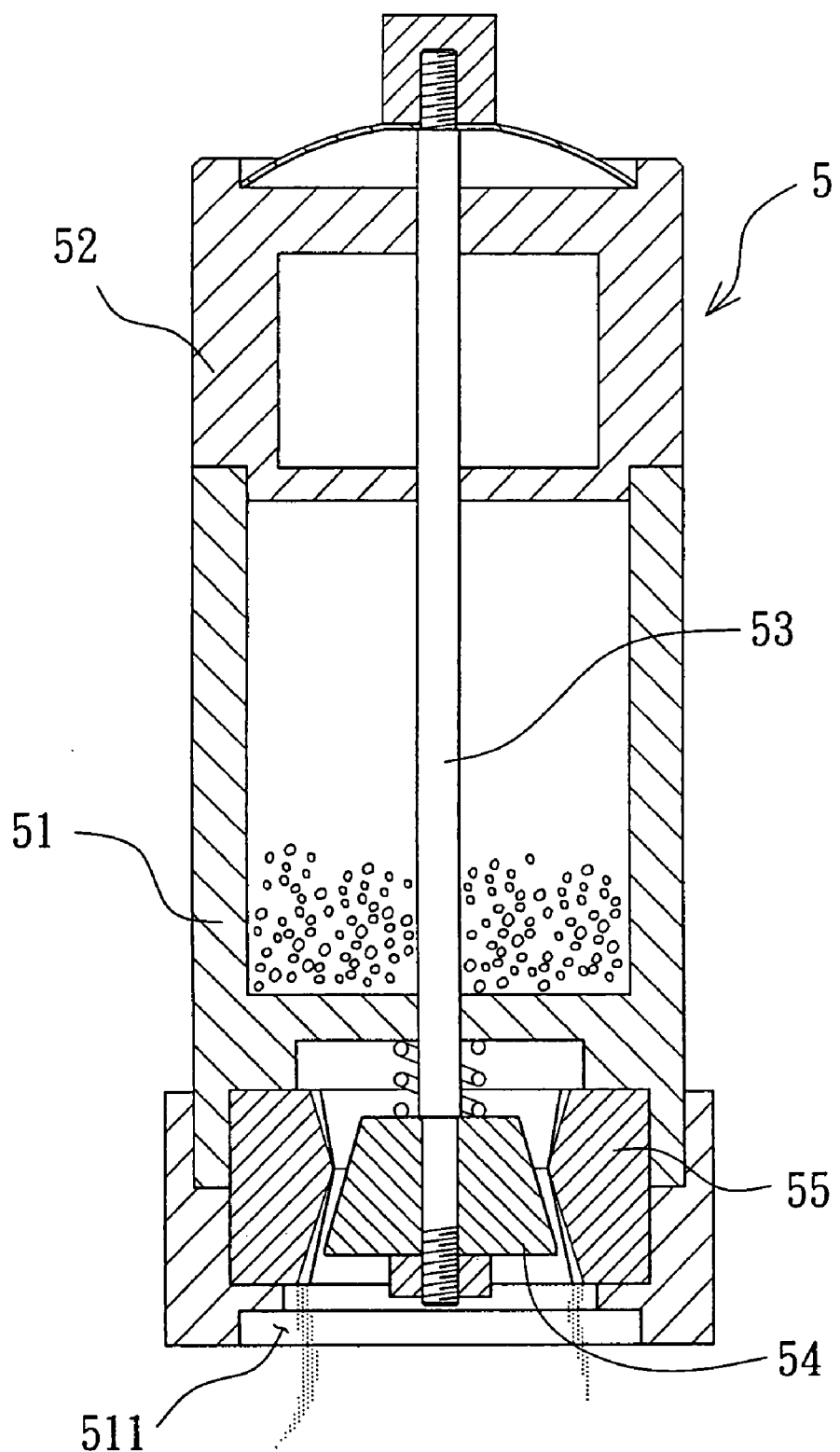
FIG. 6 is a sectional view of the prior art.

FIGS. 3 and 4 show a second preferred embodiment of a grinder in the present invention; the grinder is substantially the same as the last embodiment, yet it has a stopping board 13, which either has a conical surface 131 or includes several sloping sides. Therefore, seasoning will fall out through the outlet holes 12 of the grinder body 1 more easily after it has been ground into powder by means of the grinding mechanism 3; in other words, the user doesn't need to tilt the present grinder deliberately.

From the above description, it can be seen that the grinder of the present invention has the following advantages:

1. The grinder body has outlet holes on the lower surrounding portion to communicate with the holding room in the lower end thereof, and a stopping board secured over the lower end of the holding room. Therefore, after seasoning corns are ground into powder, the user is allowed to tilt the grinder so as to make the seasoning powder fall out through the outlet holes. And, when the grinder is standing upright on a table, the seasoning powder won't fall outside to dirty the table even if a person hits against the table or the grinder accidentally/the user fails to put the grinder on the table in a gentle manner.

2. The stopping board can be flat or formed with several sloping sides, which will help seasoning powder to pass out of the holding room through the outlet holes of the grinder body.

What is claimed is:

1. An outlet device of a grinder, comprising
   a holding room in a bottom portion of a body of the grinder, the grinder body having a rotating operational component positioned on an upper end thereof, the grinder body having a grinding mechanism therein, the rotating operational component and the grinding mechanism being coupled by means of a transmission rod;
   at least one outlet hole formed on a peripheral side of the bottom portion of the grinder body in correspondence with the holding room in order for the holding room to be in open communication with an outside; and
   a stopping board secured over a lower end of the holding room of the grinder body to seal the lower end of the holding room, the stopping board having an inner side facing the holding room and the inner side having conical contour for directing a comminuted material to flow out through the at least one outlet hole.

2. The outlet device of a grinder as claimed in claim 1, wherein: the grinder body has a holding hole, which is above the holding room, and extends through the upper end of the grinder body, and the rotating operational component having a hole extending through a center thereof; the transmission rod being received in the holding hole of the grinder body, and sticking out from the central hole of the rotating operational component at an upper end thereof; the transmission rod and the rotating operational component being joined together by means of a fixing piece, which is threadedly engaged with the transmission rod; the grinding mechanism being held in an upper portion of the holding room of the grinder body; the grinding mechanism including an inner grinding toothed member, and an outer grinding toothed member; the inner grinding toothed member being securely joined to a lower end of the transmission rod.

3. The outlet device of a grinder as claimed in claim 2, wherein the rotating operational component has a locating protrusion on a bottom thereof, which is received in the holding hole of the grinder body.

* * * * *